US008417940B2

(12) United States Patent
Maximilien et al.

(10) Patent No.: US 8,417,940 B2
(45) Date of Patent: Apr. 9, 2013

(54) SYSTEM AND DEVICE FOR PARALLELIZED PROCESSING

(75) Inventors: Benoit Maximilien, Le Chesnay (FR); Vladimir Ksinant, Issy-les-Moulineaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/597,883

(22) PCT Filed: Apr. 25, 2008

(86) PCT No.: PCT/EP2008/055118
§ 371 (c)(1), (2), (4) Date: Jun. 3, 2010

(87) PCT Pub. No.: WO2008/135418
PCT Pub. Date: Nov. 13, 2008

(65) Prior Publication Data
US 2010/0293592 A1    Nov. 18, 2010

(30) Foreign Application Priority Data
Apr. 27, 2007   (FR) ...................................... 07 03095

(51) Int. Cl.
*H04L 9/00*    (2006.01)
(52) U.S. Cl.
USPC .......................................... 713/153; 713/150

(58) Field of Classification Search .................. 713/153, 713/150
See application file for complete search history.

(56) References Cited

U.S. PATENT DOCUMENTS
7,509,141 B1 *  3/2009  Koenck et al. ............. 455/552.1
2006/0064510 A1   3/2006  Low et al.

FOREIGN PATENT DOCUMENTS
EP     1283630 A2    2/2003
WO     2007006014 A2    1/2007

* cited by examiner

*Primary Examiner* — Andrew Georgandellis
(74) *Attorney, Agent, or Firm* — Stroock & Stroock & Lavan LLP

(57) ABSTRACT

The invention relates to a system for processing data that can be exchanged between at least a first domain having a security level A and a second domain having a security level B, A being different from B, characterized in that it comprises at least one elementary entity EEi including a routing module URi and a device UTi for processing data, the routing module URi including at least one input Ii into the domain having the A security level for the data to be processed, and at least one first output Pi for the data that has not been processed and remains in the domain with the A security level, and a second output Li connected to the processing device UTi for the data processed and transferred into the domain with the B security level via the output Oi.

6 Claims, 13 Drawing Sheets

Example of connection between the elementary entities according to a vector topology

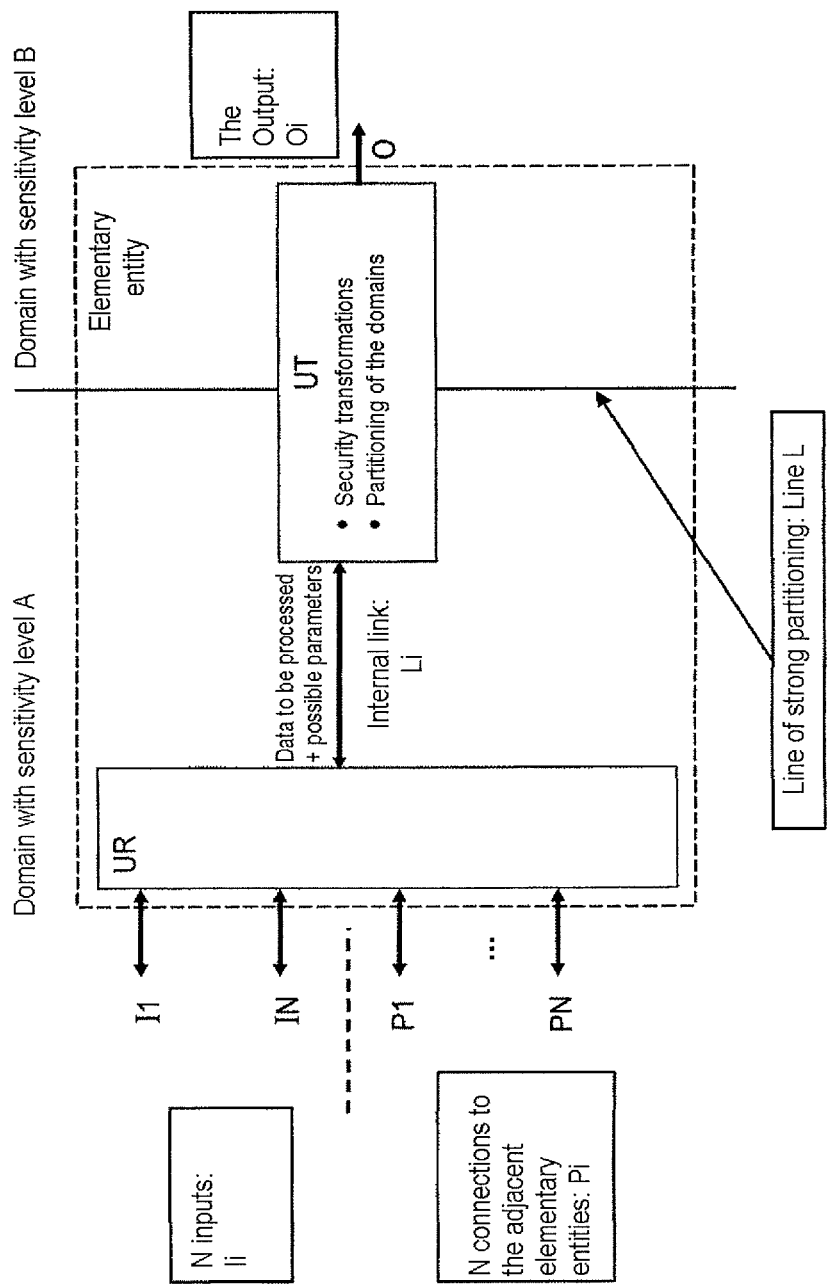

Example of connection between the elementary entities according to a ring topology Example of connection between the elementary entities according to a matrix topology

SYSTEM AND DEVICE FOR PARALLELIZED PROCESSING

The present application is the U.S. National Phase of International Patent Application Serial No. PCT/EP2008/055118, filed Apr. 25, 2008, which claims the benefit of French Patent Application Serial No. 0703095, filed Apr. 27, 2007, both of which are hereby incorporated by reference in their entireties.

The subject-matter of the invention relates to a parallelized system and method, i.e. where a plurality of elementary entities including a routing unit and a processing unit are placed in parallel, enabling the simultaneous performance of security functions in a device and strong partitioning separating two different security levels.

It is used, for example, in the domain of information systems security. More particularly, the invention relates to the parallelization of security functions enabling guaranteed partitioning of sensitive information. Thus, security functions can be implemented at high rade or being capable of attaining high performance, whereas the hardware and/or software resources used remain at low speed or with low performance. Important security properties such as partitioning continue to be scrupulously respected. Applications can be envisaged, for example, for the following equipment: high-speed IP encryptors, high-speed channel encoders (particularly Ethernet), high-speed firewall devices, etc.

In terms of information systems security, it is necessary to guarantee that an information element has undergone a certain number of processing operations before crossing a boundary (or partition) located between two zones having different security levels.

For example, FIG. 1 schematically shows the transfer of an information element A located in a domain with a high sensitivity level to a level B with a low sensitivity level, in the course of which the information element A has been transformed. It is appropriate, in particular, to be able to prove that an information element having a given high sensitivity level does not remain unchanged when transferring into a domain with a low sensitivity level.

The most common security transformations which enable the transfer from one domain to another include:
  cryptographic processing operations carried out on transferred data in order to ensure its confidentiality and/or integrity,
  filtering processing operations in order to remove information which is not authorized to transfer from one domain to the other,
  journalizing processing operations in order to keep a record of actions carried out and permit a posteriori analysis.

Some of these transformations are extremely costly in terms of processing operations and are therefore difficult to implement at high rate. In fact, they are carried out by hardware or software elements whose performance is limited.

As the security transformations corresponding to long processing operations require substantial resources, one solution consists in parallelizing the security processing operations by using high-speed routing of data to an available resource. In order for the solution to be useful, the routing must notably be faster than the security transformation (corresponding to different processing operations carried out on the data transferring from a domain with a high security level to a domain with a lower security level).

The patent FR 2 863 076 discloses a cryptographic system with a modular architecture enabling the hardware implementation of security protocols at a very high speed and with a high security level. The security domain of application of this patent relates to security products with high-speed encryption integrated into communications networks or information systems.

Firewall security equipment and encoders enabling a guaranteed high security level are also known from the prior art.

Moreover, mechanisms exist for parallelizing processing operations in the domain of operating systems. For example, FIG. 2 schematically shows a grid-based parallel architecture. However, this architecture does not readily guarantee strong partitioning.

FIG. 3 describes the parallelization mechanism implemented in an architecture of this type. In a grid, all of the links can potentially transport direct "red" and "black" information, these terms being commonly used in the technical domain.

If they prove to be effective, the devices according to the prior art nevertheless present the following disadvantages:
  They do not readily enable the parallelization of security processing operations. Their performance is therefore limited by the performances of the core components carrying out the security processing operations.
  The type of architecture does not enable scalability and adaptability of the security solution (for example, encryption equipment) according to new network constraints, such as a new usage, a new standard, new protocols, etc.
  Furthermore, current parallelization mechanisms are not simply compatible with a strict partitioning between domains with different sensitivities.

The object of the invention is based on a new approach, offering a modular device adapted to parallelize processing operations while maintaining guaranteed partitioning of sensitive information. The modular device comprises a plurality of elementary data processing entities, each entity comprising a routing unit and a processing unit. In this way, security transformations can be carried out at high speed, while continuing to use the hardware or software elements normally employed by the person skilled in the art.

The invention relates to a system for processing data that can be exchanged between at least a first domain having a security level A and a second domain having a security level B, A being different from B, characterized in that it comprises at least one elementary entity EEi including a routing module URi and a device UTi for processing data, the routing module URi including at least one input Ii into the domain having the A security level for the data to be processed, and at least one first output Pi for the data that has not been processed and remains in the domain with the A security level, and a second output Li connected to the processing device UTi for the data processed and transferred into the domain with the B security level via the output Oi.

It comprises, for example, a plurality of elementary entities parallelized with one another in such a way that the output Pi of a routing unit URi for the unprocessed data is connected to an input Ij of a routing unit URj of a different elementary entity EEj.

The elementary entities can be disposed according to a tree topology.

The elementary entities correspond, for example, to a ring topology, the domain A forming an external ring in which a plurality of elementary entities are located, each elementary entity EEi comprising a second input input2, the output Pi of an elementary entity EEi being connected to the second input Ii+1 of a following elementary entity EEi+1, each elementary entity being connected via an output Oi to the domain B.

The invention also relates to a method for processing data in a system comprising at least two domains having different security levels, the first domain having a security level A and the second domain having a security level B, characterized in that it comprises at least the following steps:

Receiving the data to be processed in the domain with the A security level,

Transmitting the data to be processed to an input of a first routing module URi, Checking whether the processing unit UTi associated with this routing module is available for processing the data, If the processing unit UTi is available, then processing the data which transfers into the domain with the B security level, If the processing unit UTi is not available, the data then remain in the domain with the A security level and are:

Either transmitted to at least one routing unit of a different elementary entity across an output PASS, Or are removed from the system, while remaining in the domain with the A security level.

The elementary entities are disposed according to a vector topology (which corresponds to an open ring topology) or a matrix topology (which corresponds to a set of vectors).

Other characteristics and advantages of the present invention will become clearer from reading the following description of an example given by way of illustration and in no way limiting, with the attached figures, in which:

FIG. 1 is an example of the processing of data between two different security levels, FIGS. 2 and 3 show an example of a grid-based parallel architecture and implementation mechanisms (prior art), FIG. 4 is a functional diagram of an elementary entity according to the invention, FIG. 5 is an example of the internal architecture of an elementary entity including a routing unit and a processing unit connected via an internal link. The elementary entities have the capacity to be interconnected, FIG. 6A is a simplified example of a connection between elementary entities according to a vector topology (pass—input links) and FIG. 6B focuses on the connection between the elementary entities or, more precisely, the constituent routing and processing units, FIG. 7 is a flowchart schematically showing the operation of the device according to the invention, FIGS. 8 and 9 are examples of different embodiments according to a ring topology, FIGS. 10 to 12 are examples of different embodiments according to a tree topology, FIGS. 13 and 14 are examples of different embodiments according to a matrix topology.

The architecture according to the invention notably comprises the following two functionalities:

Using combinations of elementary entities EEi, each adapted to carry out the necessary security transformations, Routing the data to be processed to an available elementary entity EEi.

FIG. 4 shows this architecture where an input "I" corresponding to data to be transformed is presented to the input of an elementary entity EEi.

Two outputs are possible:

an output "O", where the data has been encrypted or decrypted. This data, having undergone processing, leaves the system to go, for example, to a network or any other device, an output "PASS" or P, corresponding to a data which has not been processed (encrypted or decrypted or any other processing). It does not therefore leave the parallelized encrypting system according to the invention.

FIG. 2 shows, schematically and in a functional manner, an elementary entity according to the invention, enabling an increase in the processing capacities of a system. The function of this entity is notably to enable the parallelization of processing operations corresponding to the security transformations necessary in order to transfer from one security domain to another, for example from the domain A to the domain B as shown in FIG. 1. These transformations are implemented by processing units UT whose performance is generally limited.

FIG. 4 is a functional diagram of an elementary entity EEi according to the invention, its function being to encrypt information, and including two levels:

A routing level, implemented by a routing unit, URi, where i is the index corresponding to the rank order of the unit in the processing system, A security processing level, implemented by a processing unit, UTj, where j is the rank order of the processing unit in the system.

The routing unit must be more reactive (short processing time) than the security processing unit (long processing time) for the mechanism to be useful.

The parallelization of the elementary entities is all the more useful and effective if the routing processing is notably shorter than the security transformations.

The two entities can be associated, notably via status information indicating the availability or unavailability of the processing unit.

FIG. 5 shows an example of the architecture of the parallelized system according to the invention.

In this figure, a first sensitivity domain A and a second domain with a sensitivity level B are shown. In this example, the A sensitivity level is higher than the B sensitivity level, i.e. the information must be processed before being able to transfer from the first domain A to the domain B.

The partitioning line of the two domains is defined by the line L. In this example embodiment, the system includes a routing unit UR including a plurality of inputs I1, ..., IN, a plurality of PASS outputs P1, ... PN, an internal link Li connecting the routing unit UR to a processing unit UT, the processing unit including an output O for the processed data, i.e. for the data encrypted or decrypted according to the intended application.

FIG. 6A describes a system according to the invention including N elementary entities EEi, each comprising a routing unit URi and a processing unit UTi. The routing unit UR1 comprises a first input I1 receiving information to be processed from the domain A (high sensitivity level, for example), a first output "Ri1" via which the data to be processed is sent to an input Ti1 of the associated processing unit UT1, a second output P1 via which the data which have not been sent to the associated processing unit UT1 are transferred.

Once the processing unit UT1 has completed the processing of the data frame, the latter, being protected or transformed, is sent into the domain (low sensitivity level) via the output O1.

The second output P1 is, for example, linked to the first input I2 of a routing unit UR2 forming part of a second elementary entity EE2.

The processing unit UTi transmits an availability indication to the associated routing unit URi in a regular or continuous manner. The unit UTi may accept the flow of data to be processed or may be busy. In this latter case, the processing unit UTi must not receive the information to be processed as it is busy. The data to be processed leaving the output "PASS" of the routing unit are then transmitted to a different elementary entity.

The concatenation of the data processing is carried out, for example, in the following manner: for each elementary entity EEi, on receiving data to be processed at an input "Ii", the corresponding routing unit URi checks the availability of the processing unit UTi which is associated with it.

If it is available, the routing unit URi transmits the data to the processing unit UTi. The processing unit UTi carries out the security transformations and performs the partitioning between the different security levels (A and B).

If the processing unit UTI which is associated with it is unavailable and cannot receive information to be processed, the routing unit URi then searches for an output "PASSi" to be used to transmit the data to be processed to a different elementary entity EEk:

If an output "PASS" provides access to an available elementary entity or, more precisely, to its available processing unit, the data are then transmitted to it, If no processing entity is available, the data are removed or undergo any other processing.

FIG. 6B focuses on the connection between the elementary entities or, more precisely, the links between the constituent routing and processing units.

The root entity, EEi in the example, can not process with its UTi all of the traffic, then some of the unprocessed frames are transmitted to an elementary entity "leaf EEj" (as its routing capacity URi is greater than its processing capacity Uti).

The example is given with 2 EEs, but other "leaves or EEs" can be added: they must be interconnected according to the principle described above: connect the port Iz of a leaf EEz to the port Px of a root EEx.

In order to simplify the drawing, each EEs has a single communication port "Pi". This is an example, and 2 ports "Pi" could have been used (cf. FIG. 12) or even more, depending on the traffic requirements (the density of the traffic and the capacities of the Utx). The tree becomes increasingly complex as more ports Py are added.

The flow shown in FIG. 6B is unidirectional in order to simplify the drawing. It can of course be bidirectional: for example, it may involve a flow which is both encrypted or decrypted if the EEs are IP encryptors.

Uri (or Urj) is the secondary routing unit located after the processing unit for the outgoing flow. The direction of the arrows indicates a flow which leaves the domain A and heads towards the domain B. This direction can also be reversed as the elementary entities can process bidirectional flows (for example in the case of encryptors which can perform encryption and decryption). Conceptually, the routing unit is placed before the processing unit but, in the case of bidirectional traffic, the internal structure of an elementary entity is obviously symmetrical with a processing unit framed by two routing units.

The link L1 is used if the processing unit Ui is available. In this case, the flow is then sent to Oj following processing.

The link L2 is used once the processing unit Uti has finished its processing on the frames received on Li; it is then available to process other data.

The link L3 is used if the processing unit UTi is busy as its processing capacity is limited in relation to the incoming flow (on Li).

The link L4 is used if the processing unit Utj is available. In this case, the flow is then sent to Oj following processing.

The link L5 is used if the processing unit Utj is busy as it has reduced capacities in relation to the incoming flow on Ij. This link is connected to a different input Ih of a different entity EEh.

An example of concatenation of steps is shown in FIG. 7. They can be summarized as follows:

I—arrival of a new datum to be processed through security transformation, 1, II—is the processing unit Uti of the elementary entity EEi available?, 2, If so, the data are then processed and sent to the output "Oi", and transfer into a domain having a different security level, 3, If not, the data are then processed by this elementary entity EEi, 4, the routing unit URi seeks to reroute these data to a different elementary entity EEk. A check is or is not carried out, depending on the routing rules which are implemented, to determine whether the output "PASS" of the routing unit indicates an availability of a different elementary entity, 5. If so, the routing unit transmits the data to be processed via its output "PASS" to an elementary entity, 6. During this operation, the datum remains within the same sensitivity domain. If no elementary entity is available, the data is removed or withdrawn, 7. The data have not left the original sensitivity domain.

The partitioning of the data in a security domain which is their own is respected.

The elementary entities are interconnected by connecting the outputs "PASSi" of an elementary entity, more precisely a routing unit URi, of an elementary entity EEi, to the inputs "Ik" of a different elementary entity EEk, in general to the inputs of the routing unit URk associated with EEk.

According to one embodiment of the invention, a method enabling the data to be processed to reach an available elementary entity may involve the method described below.

Propagation of Availability Information

If the processing unit UTi of an elementary entity EEi is available, it signals this to its routing unit URi via its internal link, indicated by "LIi" in FIG. 6.

If a routing unit URi receives the information that its associated processing unit UTi is available, it signals this to all of the elementary entities connected to all of its inputs "INPUT".

If a routing unit URi receives, at one of its inputs/outputs "PASS", the information that a processing unit UTi is available:

It signals this to all the elementary entities connected to all its inputs "Ii", It retains the information that a processing unit UTi is available by using the input/output "PASS" via which the availability information arrived.

Propagation of Data to be Processed to an Available Elementary Entity

If a routing unit UR receives data to be processed, the routing unit:

checks whether its associated processing unit UT is available:

If so, it supplies it with the data to be processed,

If not, it searches among its inputs/outputs "PASS" for an input/output which indicates availability information.

If it finds one, it transmits the data to be processed to this input/output "PASS".

If it does not find one, it destroys the data to be processed or carries out a different processing (for example a temporary hold).

There are several ways to implement the method and system described above, depending on the level of implementation envisaged by the user.

The routing units UR and processing units UT can be software components. The system can then be implemented in the form of software modules which run in an environment which guarantees partitioning between modules, for example protected operating systems.

The routing units UR and processing units UT can be hardware components, such as ASIC ( . . . ), FGPA (Field Programmable Gate Array), microprocessors, etc. The system can then be implemented in the form of a card architectured around a system of electronic components.

The routing units UR and processing units UT can be security modules, such as electronic cards. The system can then be implemented in the form of a box architectured around a parallel system of security cards or modules.

The elementary entity EE is a security device, for example an IP (Internet Protocol) encryptor. The system according to the invention is then a cluster of security mini-entities which may be mini-encryptors which collectively form an encryptor offering higher performance.

In the context of the last implementation described above, any given additional entity can be interconnected and therefore added a posteriori by connecting the output "PASS" to an input of a different entity. Any network topology is possible, some of these being described below.

EXAMPLES OF POSSIBLE TOPOLOGIES

This representation has the advantage of clearly showing that the "parallelized" encrypting system is a split system, i.e. it perfectly partitions the domains A and B by separating the inputs "I" from the outputs "O".

In fact, to transfer from a domain B to A, i.e. from the input "Ic" to the output "Oc", it is necessary to pass through the security ring made up of elementary entities EEi.

The arrows in the lower part of the figure correspond to incoming data to be encrypted. They transfer into a first elementary entity EE8, then a second EE7, in which the data are encrypted and transfer into the domain A via the output O7 of EE7.

To transfer from the domain A to B, i.e. from the input "Id" to the output "Od", it is also necessary to pass through the system, irrespective of the internal path (transfer via one or more elementary entities and therefore via one or more outputs PASS).

In the case of the arrows in the upper part of the figure, this corresponds to incoming data to be decrypted. They transfer into a first elementary entity EE1, then a second EE2, in which the data are decrypted and transfer into the domain B via the output O2 of EE2.

Figure 9:
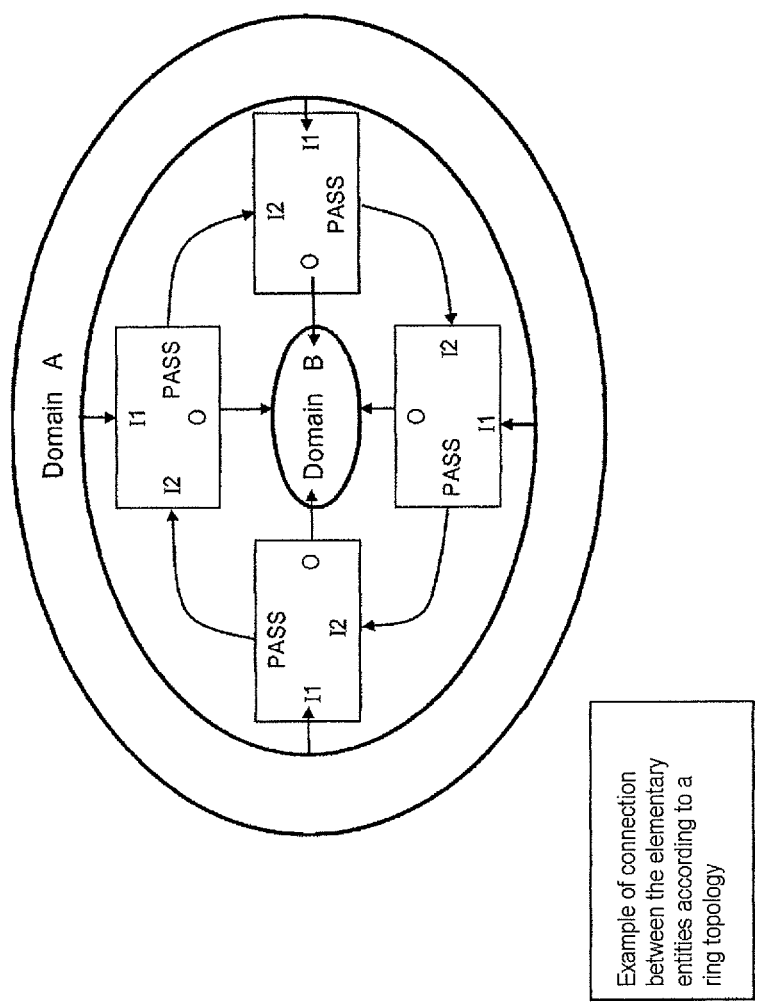

FIG. 9 shows schematically an example embodiment for which the domain A is presented in the form of an external ring, within which a plurality of elementary entities EE1, EE2, EE3, EE4 are disposed, which receive the data to be processed at a first input E1, and which send them following transformation to the domain B.

The elementary entities EEi are interconnected by connecting the outputs "pass" $P_i$ of an elementary entity to an input "$I_{2+1}$" of a different elementary entity $EE_{i+1}$. This is implemented without any restriction on the topologies created. The data to be processed are sent to the inputs of the elementary entities. The processed data are transmitted, for example, from the domain A to the domain B via the outputs O of each of the elementary entities.

Without exceeding the scope of the invention, the data processing direction can be reversed to transfer from the domain B to the domain A. In this case, the outputs O play the role of inputs and the inputs I1 correspond to the processed data.

Figure 10:
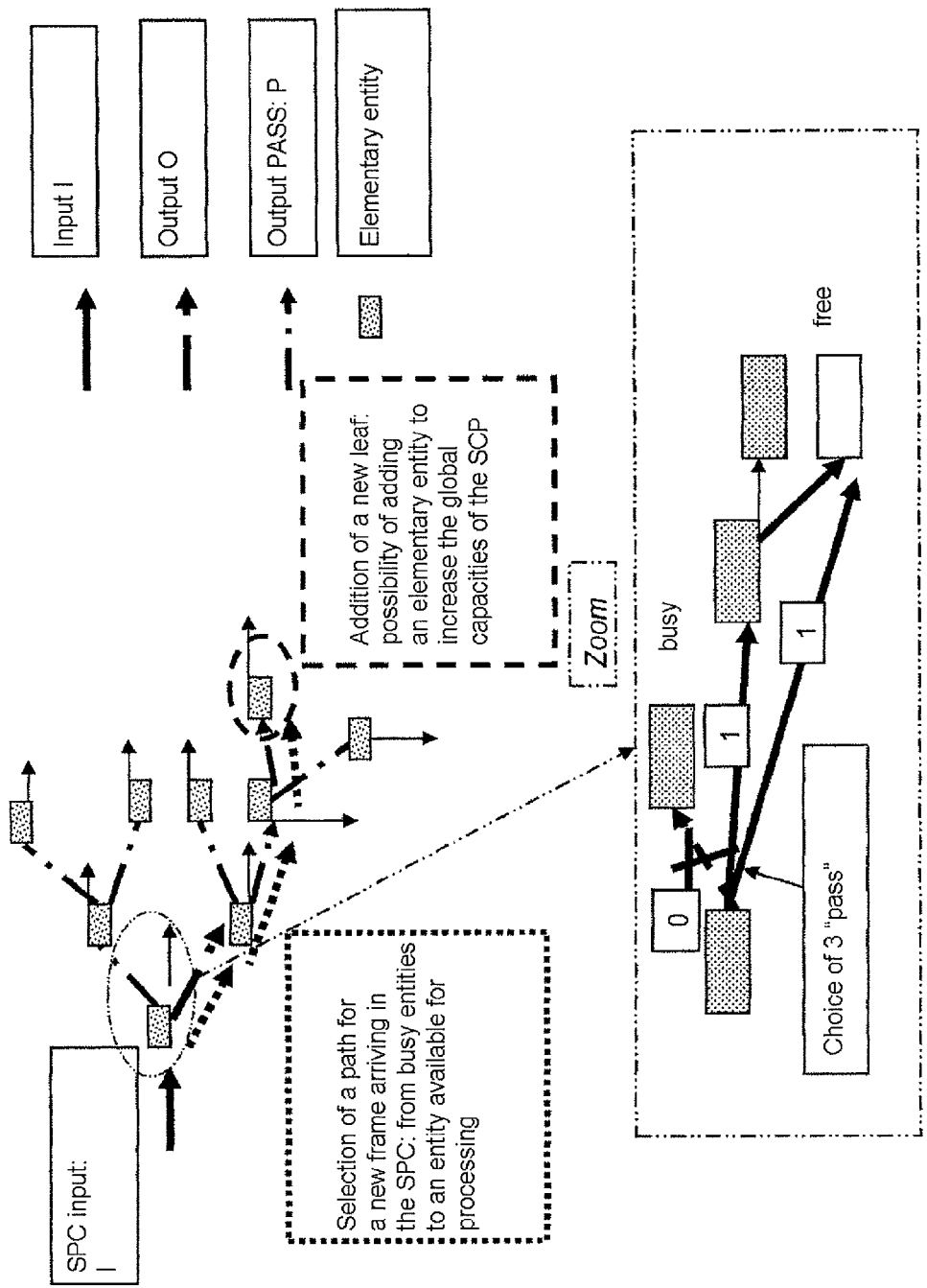
Figure 11:
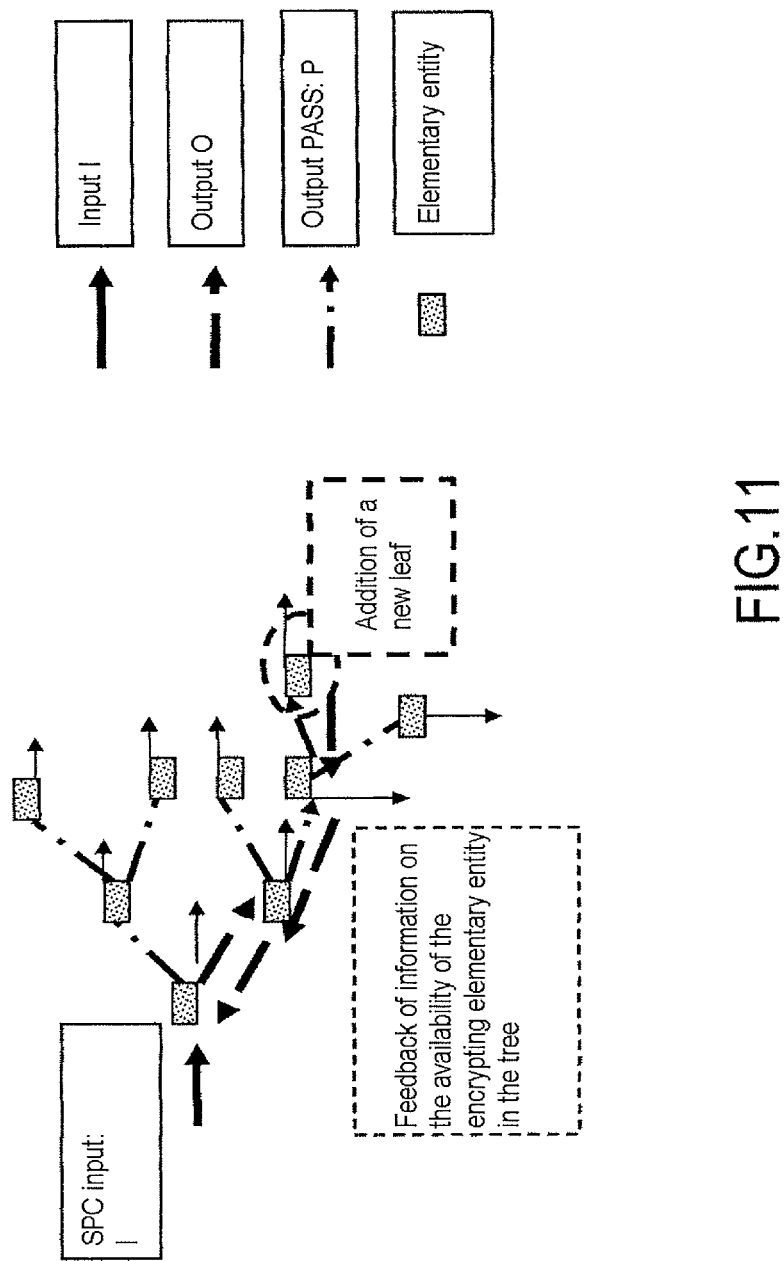
Figure 12:
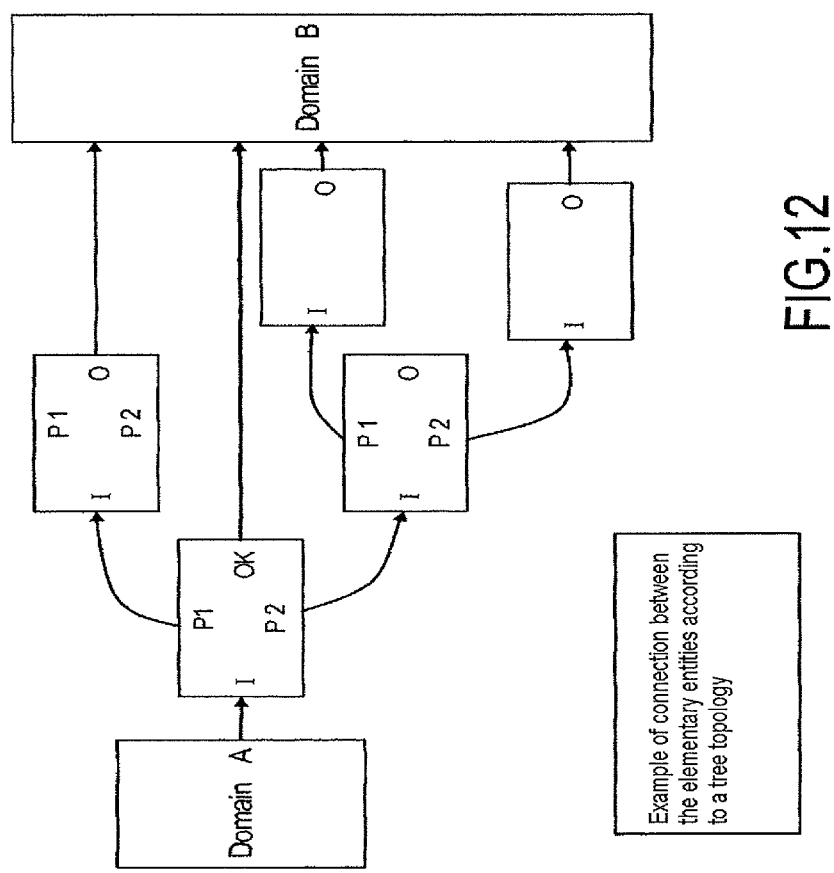

FIGS. 10, 11 and 12 show example embodiments according to a tree topology.

If I is the input into the system as a whole, in the case where the processing unit UT is busy, three outputs pass are then possible in this scheme.

It is always possible to add a new leaf to the tree, a leaf comprising an elementary entity.

Figure 13:
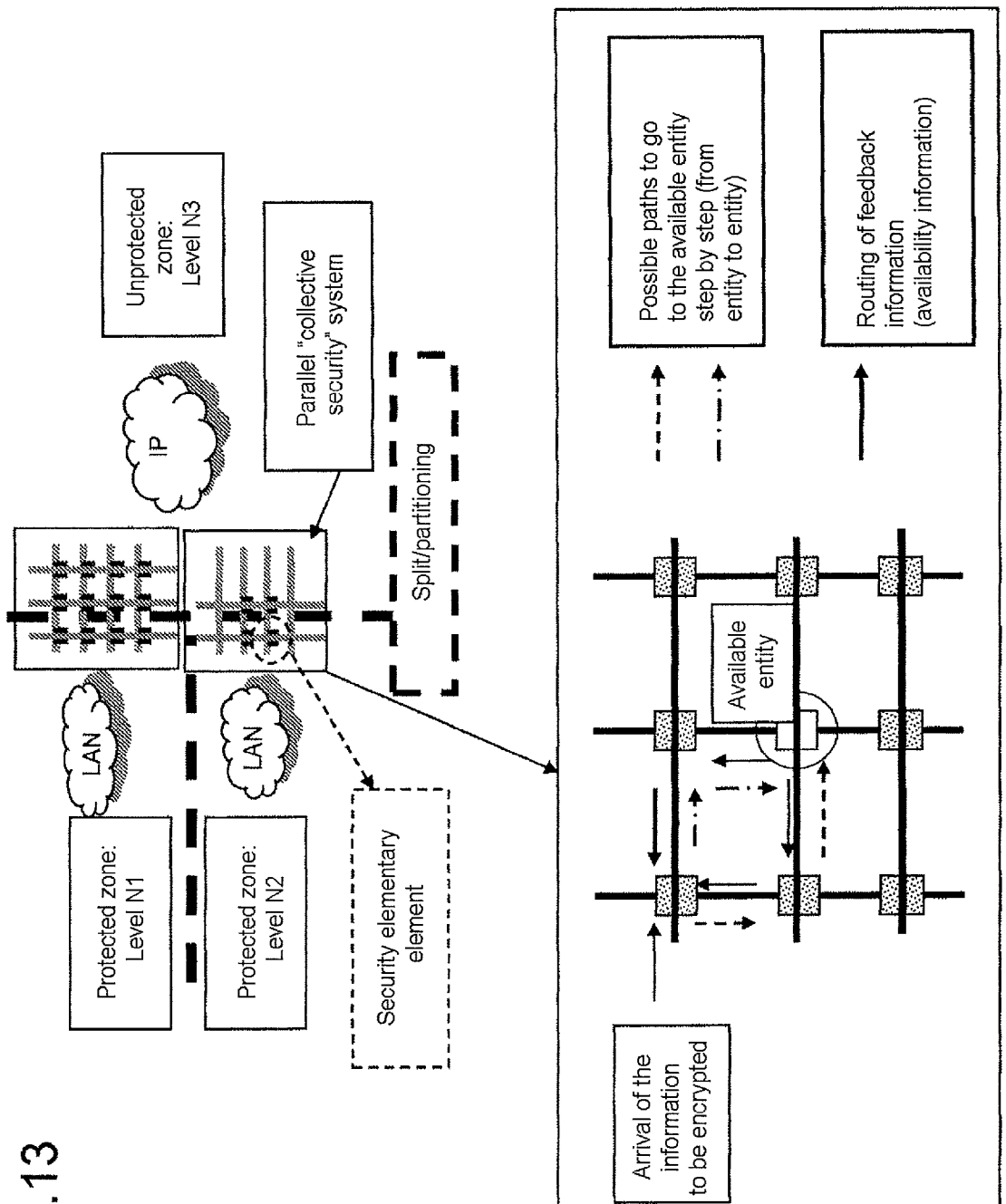
Figure 14:
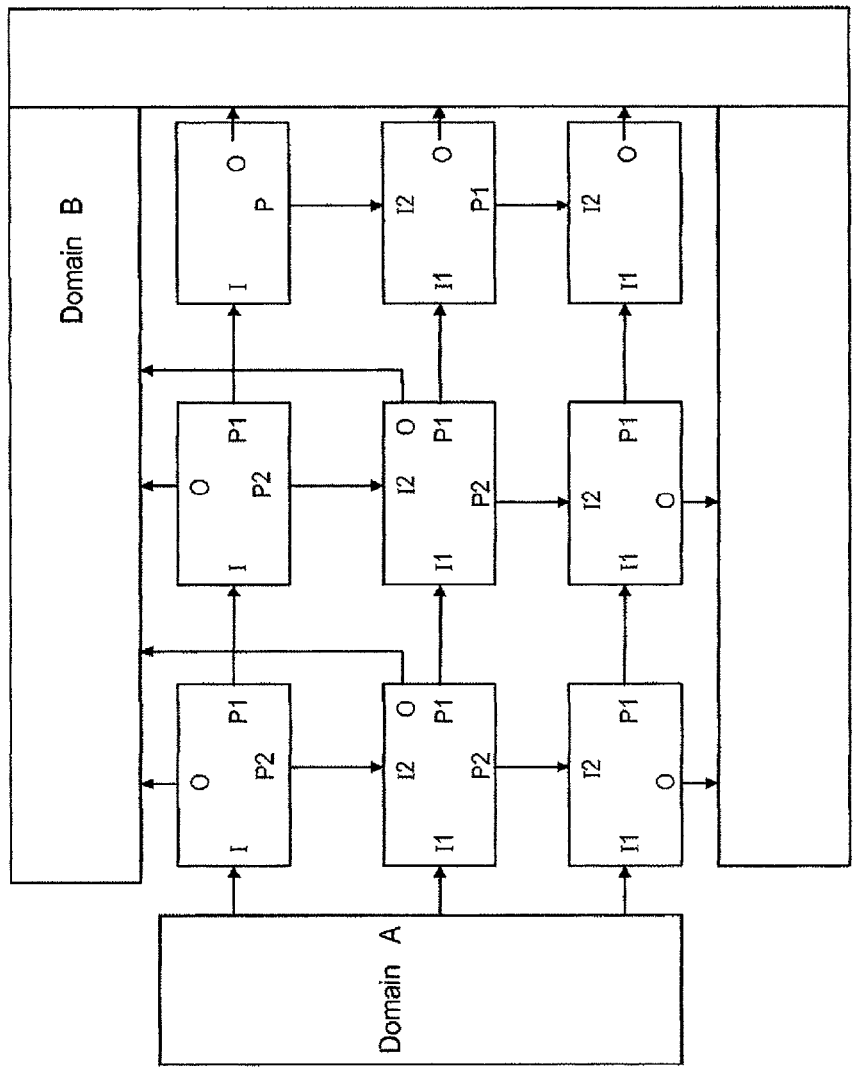

FIGS. 13 and 14 show a topology in the form of a matrix, generally referred to as a grid or mesh.

Figure 4:
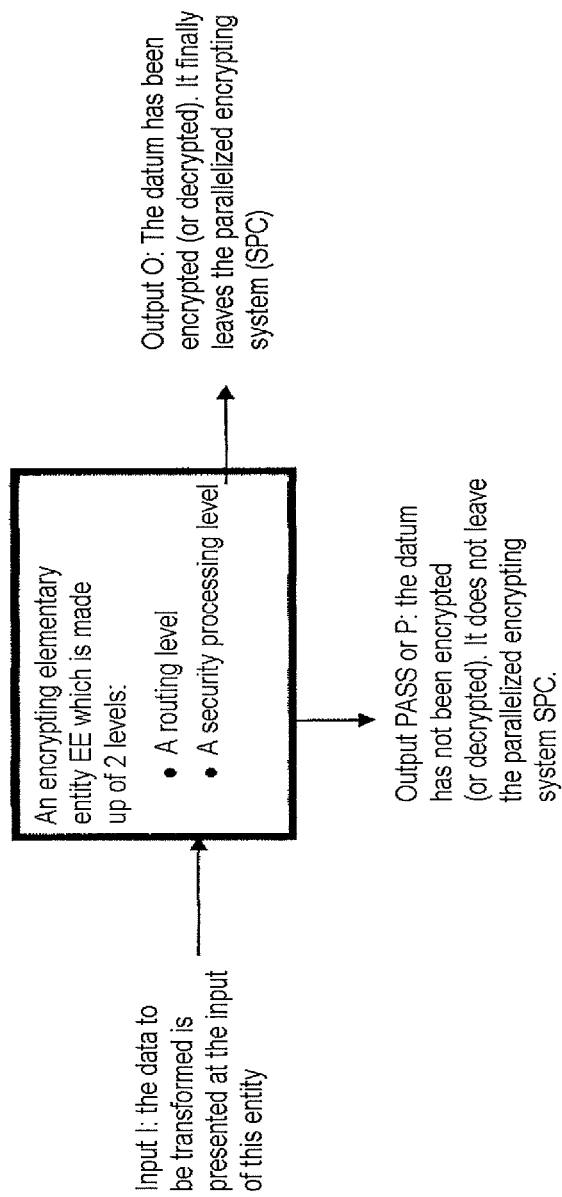
Figure 6A:
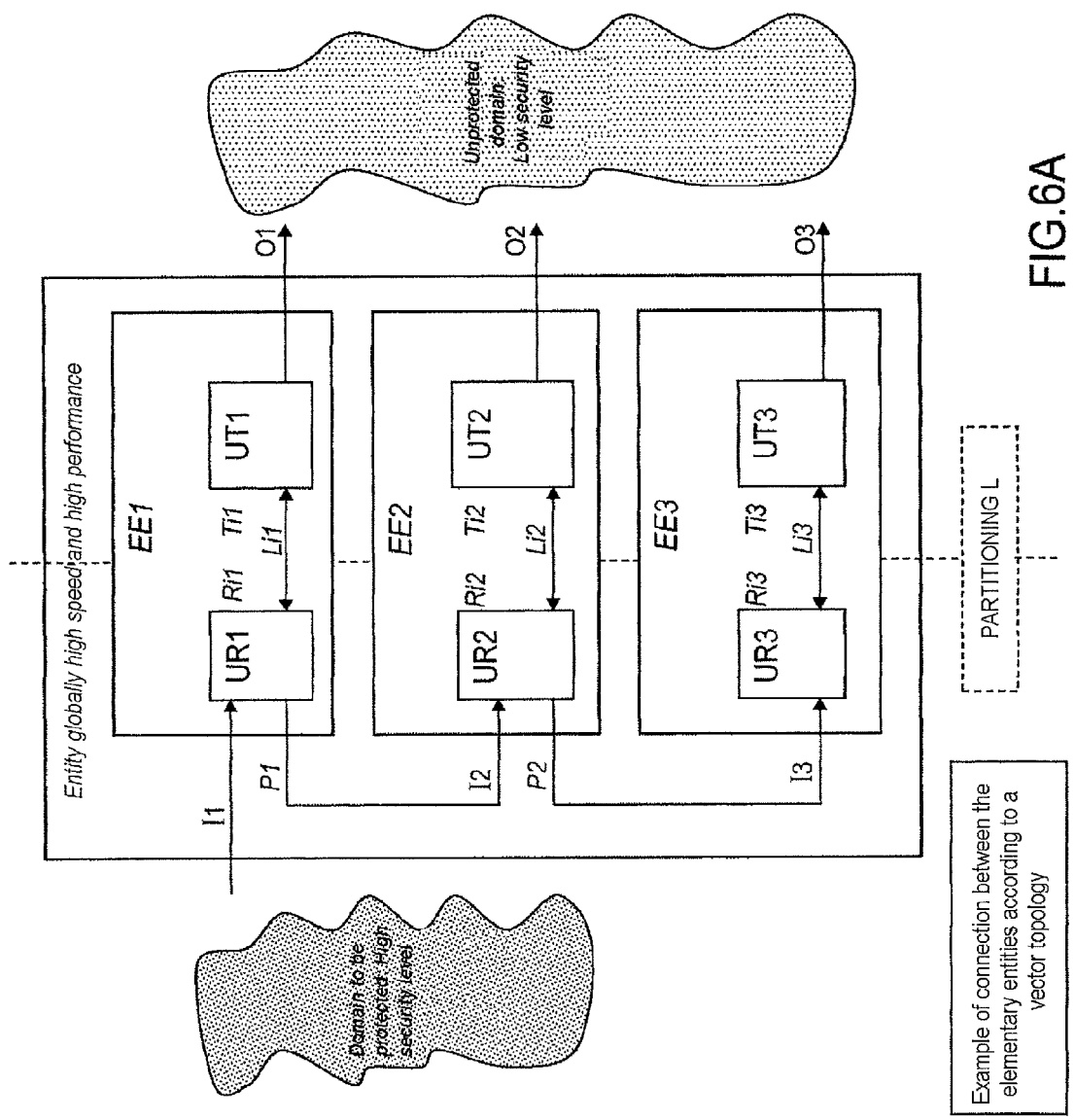
FIG. 6 shows an example embodiment in vector form, where the elementary entities EE are interconnected (as could be the case with EEs connected in an open ring)
Figure 6B:
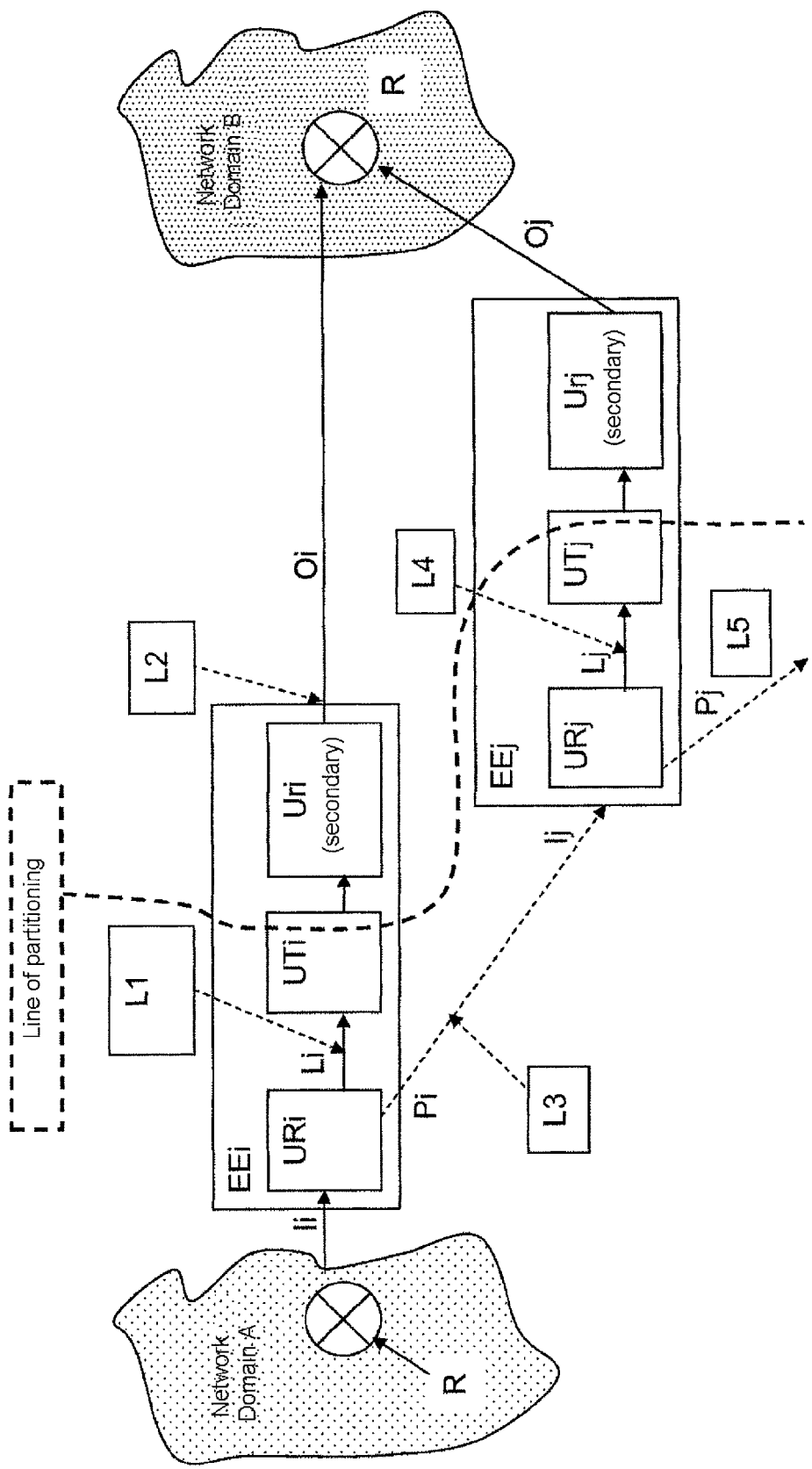
Figure 7:
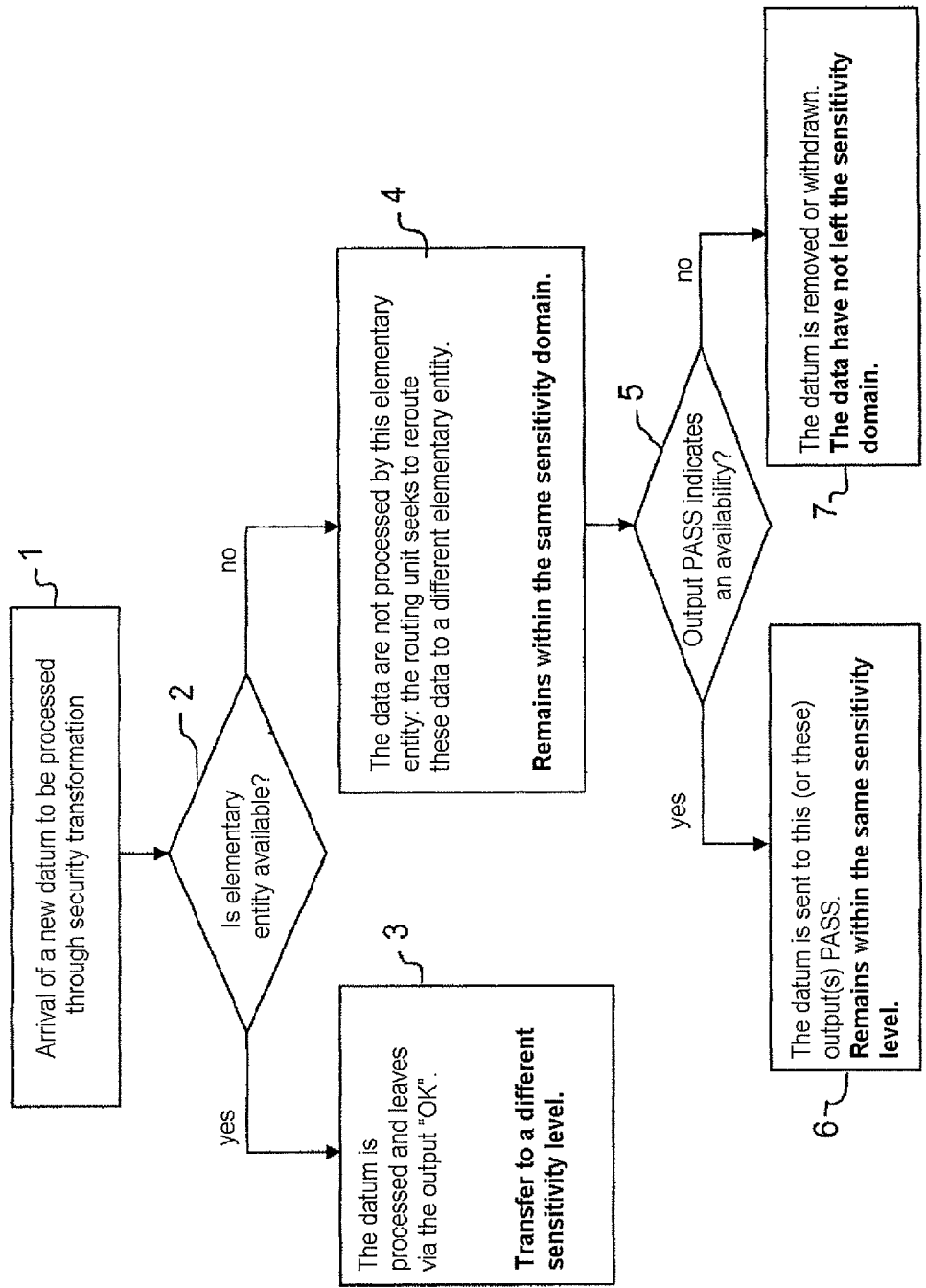
Figure 8:
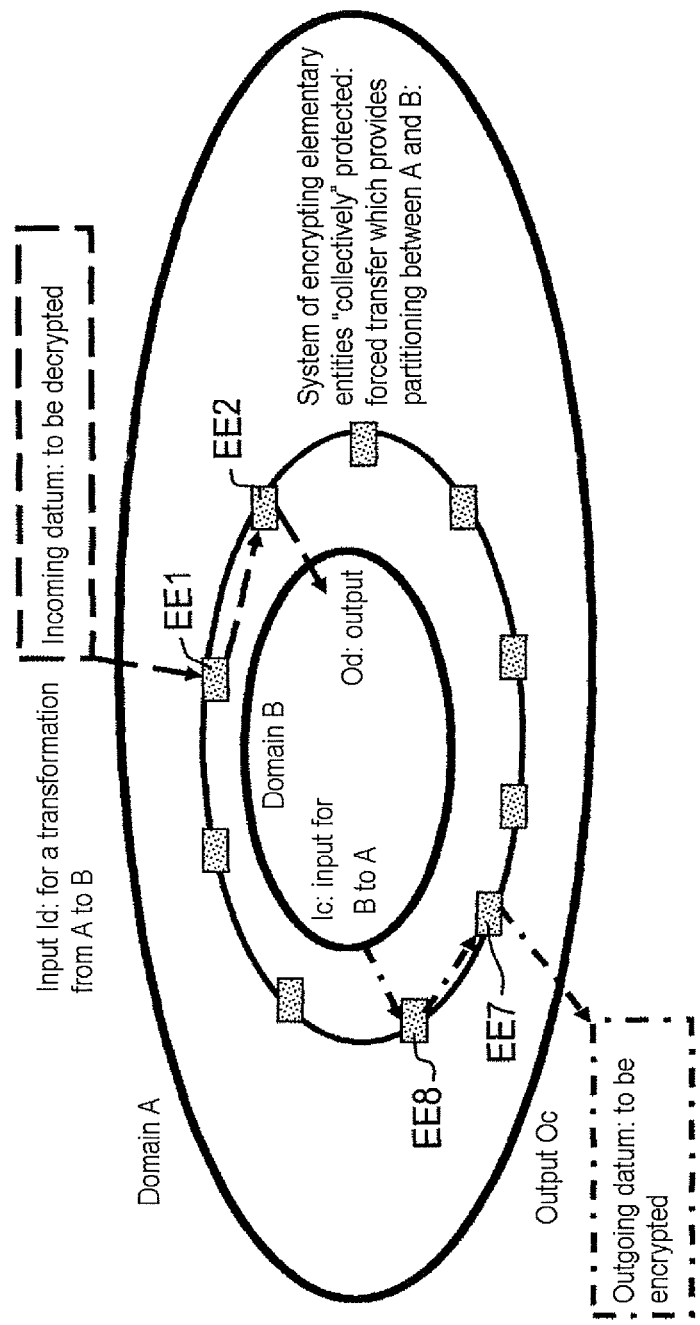
FIGS. 8 and 9 show an example embodiment in ring form, where the elementary entities EE are distributed in the form of a ring. The input corresponds to a datum to be decrypted, possibly transferring through a plurality of elementary entities $EE_1, EE_2 \ldots$ according to the availability of the associated processing units UT.

FIG. 13 shows an example comprising two protected zones with levels N1 and N2 and an unprotected IP zone (level N3). The lower part of the figure shows a detail of the processing of the information arriving at the protected system. A square represents an elementary entity according to the invention, operating in accordance with FIGS. 4 to 6, for example.

This representation offers the following advantages:

To enable high-rate multi-level adapted to requirements,

To show the power of the protected logical principle of the nodes and all of the interconnection possibilities and therefore the feedback of the information from elementary entity to elementary entity (for example from encryptors to encryptors).

The system and the method according to the invention notably offer the following advantages:

The elementary entities are put to optimum use in order to offer higher quality of service, Respect of the partitioning between domains offering different security levels, A routing function which is simple to implement and compatible with the high speed required in certain systems, A distributed and dynamic routing function, The solution operates with all types of topologies, The solution remains independent of the security processing operations carried out, The solution is simple to implement and is scalable according to the needs of the user.

Key to Figures

Figure 1:
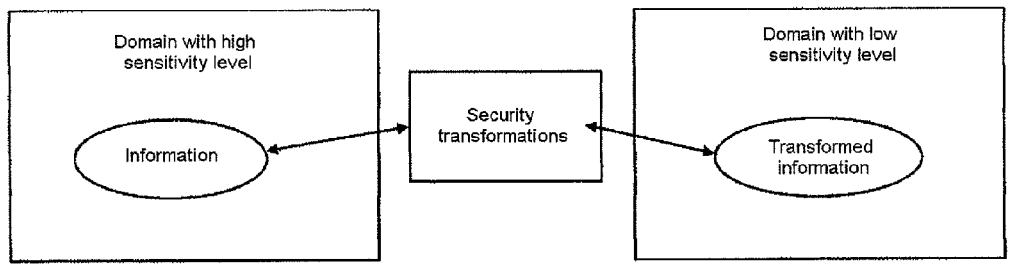
Figure 2:
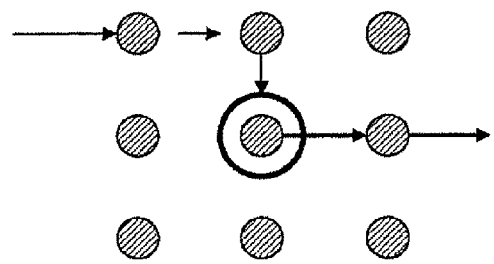
Figure 3:
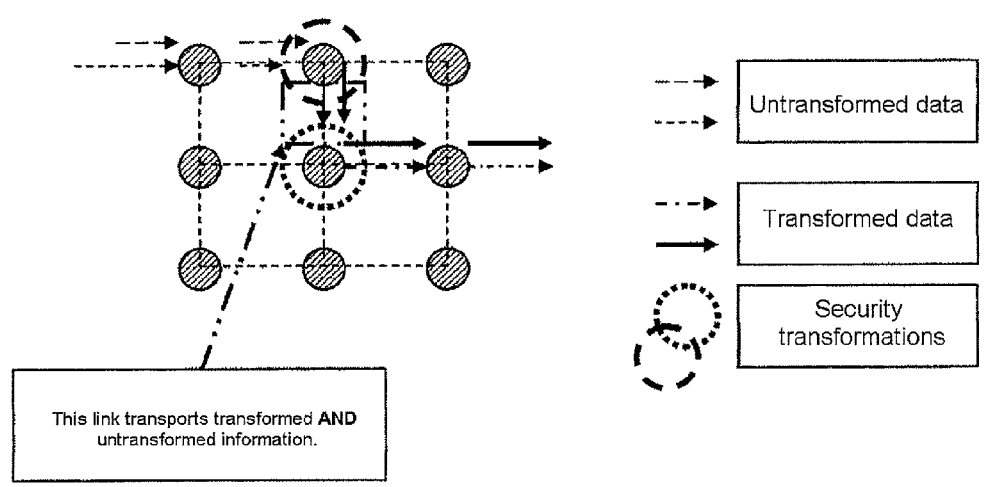

| FIG. 1 | |
| --- | --- |
| French | English |
| Domaine de haut . . . | Domain with high sensitivity level |
| Domaine de bas . . . | Domain with low sensitivity level |
| Information | Information |
| Transformations de sécurité | Security transformations |
| Information transformée | Transformed information |

FIG. 3

| French | English |
| --- | --- |
| Ce lien transporte . . . | This link transports transformed AND untransformed information. |
| Données non transformées | Untransformed data |
| Données transformées | Transformed data |
| Transformations de sécurité | Security transformations |

FIG. 4

| French | English |
| --- | --- |
| Entrée I: . . . | Input I: the data to be transformed is presented at the input of this entity |
| Une entité élémentaire EE . . . | An encrypting elementary entity EE which is made up of 2 levels: A routing level A security processing level |
| Sortie O: . . . | Output O: The datum has been encrypted (or decrypted). It finally leaves the parallelized encrypting system (SPC) |
| Sortie PASS ou P: . . . | Output PASS or P: the datum has not been encrypted (or decrypted). It does not leave the parallelized encrypting system SPC. |

FIG. 5

| French | English |
| --- | --- |
| Domaine de . . . A | Domain with sensitivity level A |
| Domaine de . . . B | Domain with sensitivity level B |
| N entreés: | N inputs: |
| Ii | Ii |
| N connexions . . . | N connections to the adjacent elementary entities: Pi |
| Données à traiter . . . | Data to be processed + possible parameters |
| Liaison interne: | Internal link: |
| Li | Li |
| UT . . . | UT Security transformations Partitioning of the domains |
| Entité élémentaire | Elementary entity |
| La | The |
| Sortie: | Output: |
| Oi | Oi |
| Ligne de . . . | Line of strong partitioning: Line L |

FIG. 6A

| French | English |
| --- | --- |
| Entité . . . | Entity globally high speed and high performance |
| Domaine à protéger . . . | Domain to be protected: High security level |
| Domaine non protégé . . . | Unprotected domain: Low security level |
| Exemple de . . . | Example of connection between the elementary entities according to a vector topology |
| CLOISONNEMENT L | PARTITIONING L |

FIG. 6B

| French | English |
| --- | --- |
| Ligne de cloisonnement | Line of partitioning |
| Réseau Domaine A | Network Domain A |
| Réseau Domaine B | Network Domain B |
| (secondaire) | (secondary) |
| (secondaire) | (secondary) |

FIG. 7

| Drawing ref. no. | English |
| --- | --- |
| 1 | Arrival of a new data to be processed through security transformation |
| 2 | Is elementary entity available? |
| oui | yes |
| non | no |
| 3 | The data is processed and leaves via the output "OK". Transfer to a different sensitivity level. |
| 4 | The data are not processed by this elementary entity: the routing unit seeks to reroute these data to a different elementary entity. Remains within the same sensitivity domain. |
| 5 | Output PASS indicates an availability? |
| oui | yes |
| non | no |
| 6 | The data is sent to this (or these) output(s) PASS. Remains within the same sensitivity level. |
| 7 | The data is removed or withdrawn. The data have not left the sensitivity domain. |

FIG. 8

| French | English |
| --- | --- |
| Entrée Id: . . . | Input Id: for a transformation from A to B |
| Donnée entrante: . . . | Incoming data: to be decrypted |
| Domaine A | Domain A |
| Domaine B | Domain B |
| Ic: entrée pour B vers A | Ic: input for B to A |
| Sortie Oc | Output Oc |
| Od: sortie | Od: output |
| Donnée sortante: . . . | Outgoing data: to be encrypted |
| Système d'entités . . . | System of encrypting elementary entities "collectively" protected: forced transfer which provides partitioning between A and B: |

FIG. 9

| French | English |
| --- | --- |
| Domaine A | Domain A |
| Domaine B | Domain B |

FIG. 9

| French | English |
| --- | --- |
| Exemple de . . . | Example of connection between the elementary entities according to a ring topology |

FIG. 10

| French | English |
| --- | --- |
| Entrée du SPC: I | SPC input: I |
| Entrée I | Input I |
| Sortie O | Output O |
| Sortie PASS: P | Output PASS: P |
| Entité élémentaire | Elementary entity |
| Sélection d'un . . . | Selection of a path for a new frame arriving in the SPC: from busy entities to an entity available for processing |
| Ajout d'une . . . | Addition of a new leaf: possibility of adding an elementary entity to increase the global capacities of the SCP |
| Zoom | Zoom |
| occupé | busy |
| Choix . . . | Choice of 3 "pass" |
| libre | free |

FIG. 11

| French | English |
| --- | --- |
| Entrée du SPC: I | SPC input: I |
| Entrée I | Input I |
| Sortie O | Output O |
| Sortie PASS: P | Output PASS: P |
| Entité élémentaire | Elementary entity |
| Remonter de . . . | Feedback of information on the availability of the encrypting elementary entity in the tree |
| Ajout d'une . . . | Addition of a new leaf |

FIG. 12

| French | English |
| --- | --- |
| Domaine A | Domain A |
| Domaine B | Domain B |
| Exemple de . . . | Example of connection between the elementary entities according to a tree topology |

FIG. 13

| French | English |
| --- | --- |
| Zone protégée de niveau N1 | Protected zone: Level N1 |
| Zone protégée de niveau N2 | Protected zone: Level N2 |
| Zone non protégée: Niveau N3 | Unprotected zone: Level N3 |
| Elément . . . | Security elementary element |
| Système parallèle . . . | Parallel "collective security" system |

FIG. 13

| French | English |
| --- | --- |
| Coupure/Cloisonnement | Split/partitioning |
| Arrivée de . . . | Arrival of the information to be encrypted |
| Entité dispo | Available entity |
| Chemins possibles . . . | Possible paths to go to the available entity step by step (from entity to entity) |
| Cheminement de . . . | Routing of feedback information (availability information) |

FIG. 14

| French | English |
| --- | --- |
| Domaine A | Domain A |
| Domaine B | Domain B |
| Exemple de . . . | Example of connection between the elementary entities according to a matrix topology |

The invention claimed is:

1. A system for processing data, the system comprising:
at least two domains having different security levels, the data being able to be exchanged between at least a first domain having a security level A and a second domain having a security level B, A being different from B
a plurality of elementary entities, each elementary entity including a routing module and a processing device, the routing module including a first input in the domain having the A security level for receiving data to be processed, a first output into the domain having the A security level for outputting data that has not been processed and that remains in the domain with the A security level, and a second output for outputting data to the processing device to be processed by the processing device and transferred into the domain with the B security level via an output of the processing device,
wherein each of the plurality of elementary entities is communicatively connected to another elementary entity only through the respective routing module,
and wherein for each elementary entity, the processing device in that elementary entity is communicatively connected to the domain having the security level A only through the second output of the corresponding routing module for that elementary entity.

2. The system as claimed in claim 1, wherein the elementary entities are disposed in parallel with one another.

3. The system as claimed in claim 1, wherein the elementary entities are disposed according to a tree topology.

4. The system as claimed in claim 1, wherein the elementary entities correspond to a ring topology, the domain A forming an external ring in which the plurality of elementary entities are located, the routing module of each elementary entity further comprising a second input, the first output of the routing module of each elementary entity being connected to the second input of the routing module of a subsequent elementary entity, each elementary entity being connected via the output of the processing device of the elementary entity to the domain B.

5. The system as claimed in claim 1, wherein the elementary entities are disposed according to a vector topology which corresponds to an open ring topology, or a matrix topology which corresponds to a set of vectors.

6. A method for processing data in a system including at least two domains having different security levels, a first domain having a security level A and a second domain having a security level B, and a plurality of elementary entities, each elementary entity including a routing module and a corresponding processing unit, and each routing module including an input, a first output, and a second output, the method comprising the following steps:
- receiving security level A data to be processed in the domain with the A security level,
- transmitting the security level A data to be processed to the input of the routing module of a first elementary entity,
- at the routing module of the first elementary entity, checking availability of the processing unit of the first elementary entity, the processing unit of the first elementary entity being communicatively connected to the domain having the security level A only through the second output of the routing module of the first elementary entity,
- if the routing module of the first elementary entity determines that the processing unit of the first elementary entity is available, then transferring the security level A data to the processing unit of the first elementary entity via the second output of the routing module of the first elementary entity and processing the security level A data using the processing unit of the first elementary entity, which then transfers the processed data into the domain with the B security level,
- if the routing module of the first elementary entity determines that the processing unit of the first elementary entity is not available, the security level A data then remains in the domain with the A security level and is either:
  - transmitted by the routing module of the first elementary entity via the first output of the routing module of the first elementary entity to the input of the routing module of a second elementary entity,
  - or is removed from the system, while remaining in the domain with the A security level.

* * * * *